STABILIZED PINCH AXIAL FIELD DISTRIBUTION AS A FUNCTION OF INSULATOR THICKNESS, $\epsilon$ STABILIZED PINCH AXIAL FIELD DISTRIBUTION FOR OSCILLATING $H_z$ STABILIZED PINCH AXIAL FIELD DISTRIBUTION FOR SELF-PROGRAMMED $H_z$

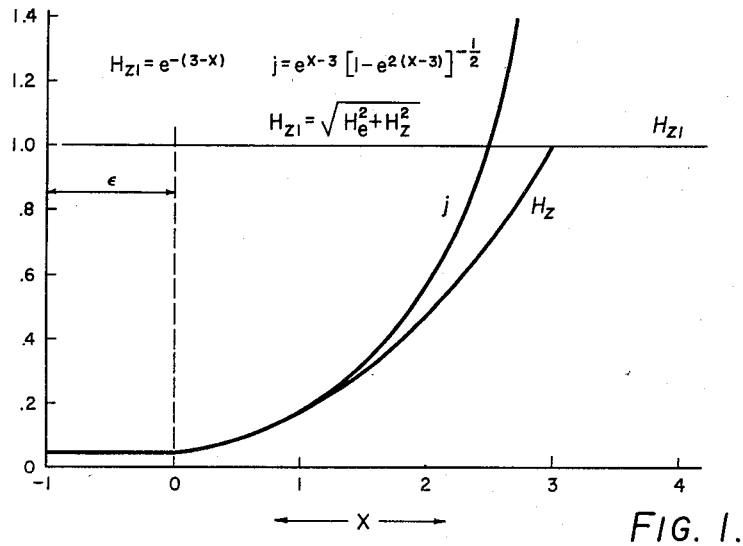
FIG. 1.
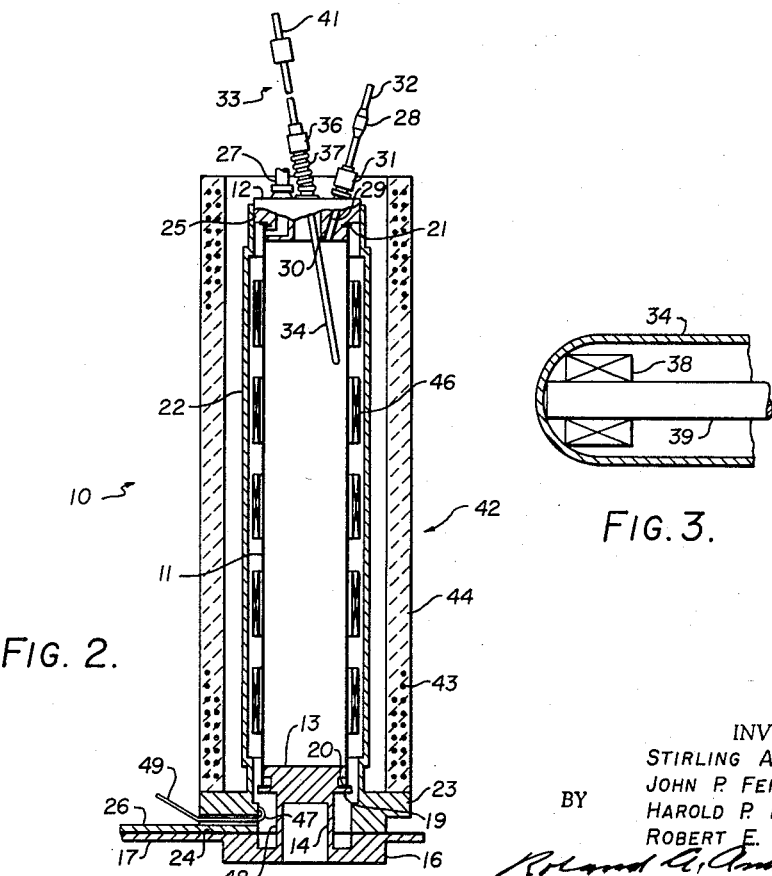
FIG. 2.
FIG. 3.
INVENTORS.
STIRLING A. COLGATE
JOHN P. FERGUSON
HAROLD P. FURTH
ROBERT E. WRIGHT
BY
ATTORNEY.

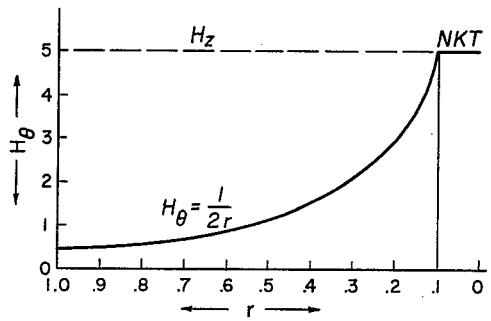
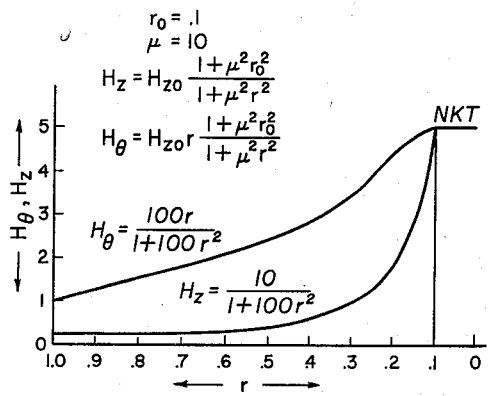
FIG. 8.                    FIG. 9.
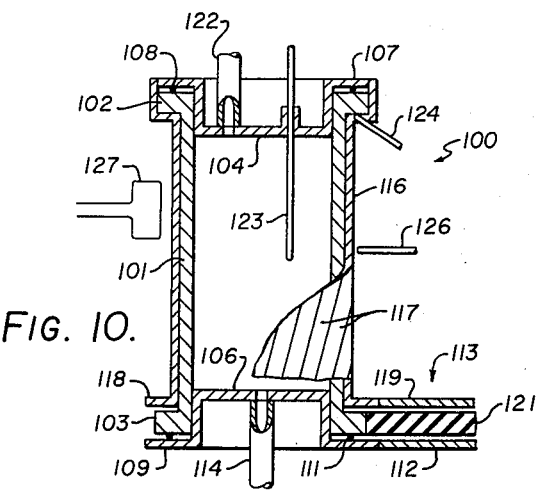
FIG. 10.
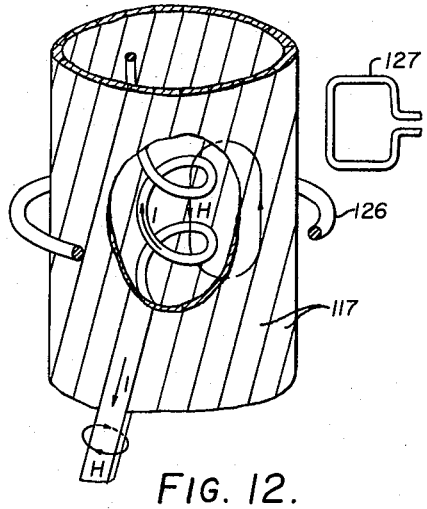
FIG. 12.
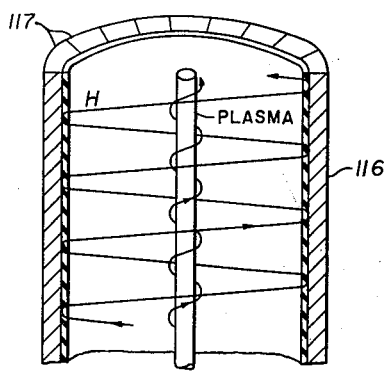
FIG. 11.
INVENTORS.
STIRLING A. COLGATE
JOHN P. FERGUSON
BY HAROLD P. FURTH
ROBERT E. WRIGHT
ATTORNEY.

INVENTORS.
STIRLING A. COLGATE
JOHN P. FERGUSON
HAROLD P. FURTH
ROBERT E. WRIGHT
BY Roland A. Anderson
ATTORNEY.

INVENTORS:
STIRLING A. COLGATE
JOHN P. FERGUSON
HAROLD P. FURTH
ROBERT E. WRIGHT

BY

ATTORNEY.

INVENTORS.
STIRLING A. COLGATE
JOHN P. FERGUSON
HAROLD P. FURTH
ROBERT E. WRIGHT

ATTORNEY.

INVENTORS.
STIRLING A. COLGATE
JOHN P. FERGUSON
HAROLD P. FURTH
ROBERT E. WRIGHT

BY

ATTORNEY.

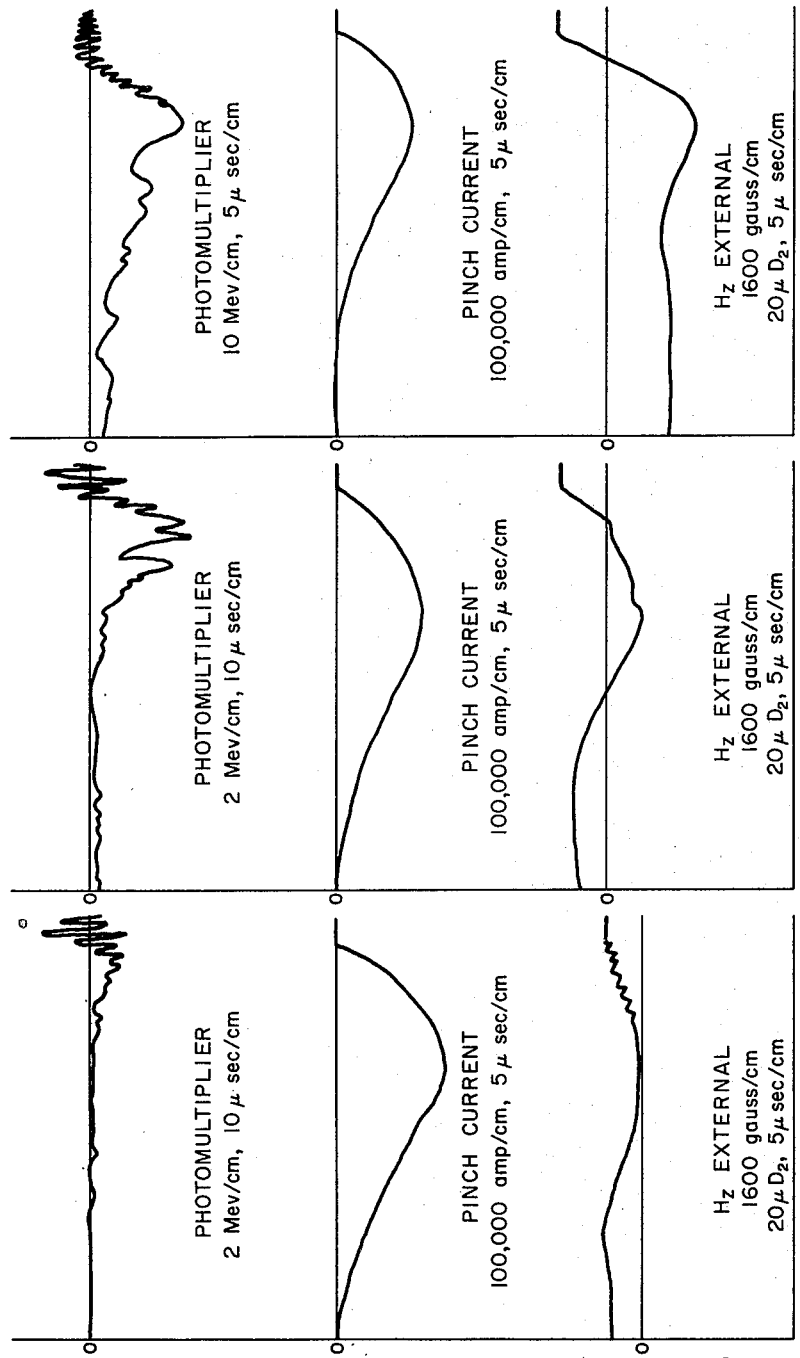

_United States Patent Office_

2,946,914
Patented July 26, 1960

2,946,914

APPARATUS FOR PRODUCING AND MANIPULATING PLASMAS

Stirling A. Colgate, Livermore, John P. Ferguson, Los Altos, Harold P. Furth, Berkeley, and Robert E. Wright, Hayward, Calif., assignors to the United States of America as represented by the United States Atomic Energy Commission Filed June 16, 1958, Ser. No. 742,445

17 Claims. (Cl. 313—231)

The present invention relates, in general, to the production of plasmas and, more particularly, to methods and apparatus for producing stabilized plasmas.

The production, manipulation and utilization of plasmas, i.e., high temperature mixtures of ions and electrons is required in the operation of a wide variety of apparatus. A plasma may, for example, be employed in various spectrographic operations or to simulate the effect of high temperature effects such as those which high speed missiles undergo in transit through the atmosphere. Moreover, plasmas of certain light elements, i.e., D, T, $He^3$, etc., constitute controlled thermonuclear reaction media and are produced in a wide variety of fusion reactors employing magnetic containment fields whereby energetic particles, heat, radiation and other useful products are obtained. Small compact neutron sources may also be provided which produce neutrons by DD reactions in a plasma.

Thermonuclear reactors employing the so-called "pinch effect" have been widely used and publicized to a greater extent than other systems in the past. Many of such reactors have various features in common since they are concerned with the production, manipulation and utilization of a thermonuclear reaction plasma in magnetic field configurations which have various characteristics in common. Linear pinch type apparatus provides a very simple means for studying the behavior of plasmas; however, it is generally believed that the toroidal type are more applicable for large-scale operations due to reduction of end losses. Experience with simple pinch apparatus indicates that various instabilities occur at early stages in the production of a pinch discharge or plasma which disrupt the plasma and prevent the attainment of the stable high temperature plasmas which are necessary to obtain stable and high efficiency operation of the apparatus.

Considerable progress has been made towards stabilizing the pinch discharge by providing accessory magnetic fields which reduce or eliminate one or more of the instabilities which occur in such discharges. One of the more successful methods of stabilization is that disclosed in the copending application of Stirling A. Colgate et al., Serial No. 685,771, together with an exhaustive analysis of such instabilities and the conditions necessary to obtain a thermonuclear reaction in such a reactor, which disclosure is incorporated herein by reference. Such stabilization is effected by including an internal longitudinal or axial magnetic field, $H_z$, in the plasma column and operating within specified regions of stability as well as employing an external stabilizing shell to which flux lines couple.

In order to obtain most effective stabilization the zone between the entrapped magnetic stabilizing field, $H_z$, and the azimuthal field, $H_\theta$, must be thin compared to the radius of the plasma since the existence of a small amount of $H_z$ field external of the plasma can exert a very strong de-stabilizing influence. The establishment of a sharp boundary zone has therefore been sought and obtained with a degree of success for certain types of discharges; however, various linear and toroidal pinch experiments have yielded magnetic field distributions which are so diffuse that neither practical nor theoretical stability can be shown. It was originally thought that the resistive diffusion of the orthogonal fields, $H_z$ and $H_\theta$, into each other would be a limiting factor in sharp boundary formation but that an adequately sharp field distribution would be obtained with a sufficiently rapid rate of pinch formation, i.e., attainment of high plasma conductivity. This condition is necessary but not completely sufficient to obtain consistently sharp field separations or boundaries.

Ordinarily, the region between the insulating vacuum chamber wall and the pinch discharge proper has been considered to be a vacuum field region; however, this region is not actually a vacuum since a gas such as deuterium is boiled off of the walls by the heat of pinch formation and occupies the indicated region. Since this gas is easily ionized and may have a density in excess of $10^{13}$ electrons per cc., the region may have a conductivity comparable to that existing within the pinch itself. This external plasma may even be hotter than plasma inside the pinch if diffusion heating occurs. The external plasma conductivity will, in general, be sufficiently great to entrap any residual $H_z$ flux external of the pinch proper and prevent uniform distribution thereof within the tube.

In accordance with the present invention the boundary value of the axial field, $H_z$, at the insulating wall is caused to be reduced to a zero value or to a value which is an appropriately programmed function of compression whereby the boundary between the $H_z$ fields within a high conductivity pinch and the $H_\theta$ field external thereto is made sharp and the pinch is stabilized. Other stabilizing effects may also be obtained by appropriate programming and utilization of the external conductivity of the plasma as disclosed hereinafter. Ordinarily the present method of stabilizing a plasma will be applied to a high conductivity discharge so that the added stabilizing effect due to controlled diffusion broadening may be utilized.

Accordingly, it is an object of the invention to provide methods and apparatus for producing stabilized high temperature plasmas.

Another object of the invention is to provide methods and apparatus for producing stabilized pinch discharges.

Still another object of the invention is to provide methods and apparatus wherein the external conductivity of a pinch discharge is utilized to provide magnetic field distributions which stabilize such discharges.

A further object of the invention is to provide methods and apparatus wherein the axial field $H_z$ external to a stabilized pinch discharge is reduced to a negligible value so as to provide a sharp stabilizing boundary between internal $H_z$ and external $H_\theta$ fields of the discharge.

A still further object of the invention is to provide methods and apparatus wherein the boundary value at the insulating wall of the axial field, $H_z$, is reduced to a negligible value or to a value which is an appropriately programmed function of compression of the plasma to obtain stabilization and create other beneficial effects in the plasma.

Other objects and advantages of the invention will become apparent by consideration of the following description taken in conjunction with the accompanying drawings of which:

Figure 1 is a simplified graphical representation of a side wall portion of a pinch tube illustrating a current distribution in a pinch discharge;

Figure 2 is a vertical cross-sectional view of a stabilized linear pinch tube including magnetic field producing means for operation in accordance with the invention;

Figure 3 is a cross-sectional view of the tip of a probe employed to measure field distributions;

Figure 8 is a graphical representation of the field distribution with uniform $H_z$ field external to a standard dynamic pinch discharge;

Figure 9 is a graphical representation of the screw dynamic pinch distribution under specified conditions;

Figure 10 is a vertical cross-sectional view of a screw dynamic pinch tube apparatus;

Figure 11 is an idealized representation of the magnetic field configuration in the plasma within the tube of Figure 10;

Figure 12 is an idealized representation indicating electrical currents, magnetic fields and field pickup loops employed in various screw dynamic pinch experiments;

Figure 24 is a graphical illustration of results employing the "gamma" toroidal pinch without programmed $H_z$ field;

Figure 25 is a graphical illustration of results employing the "gamma" toroidal pinch with external $H_z$ field programmed or reduced to about zero at the tube wall; and Figure 26 is a graphical illustration of results employing the "gamma" toroidal pinch with external $H_z$ reduced to negative value at the tube wall.

Figure 4:
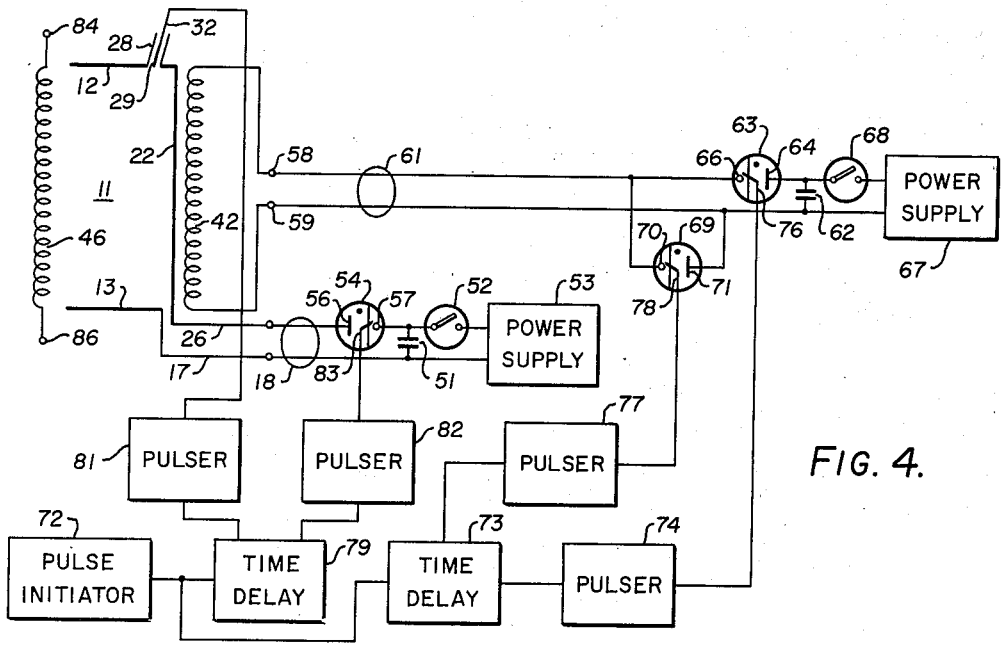
Figure 4 is a schematic simplified wiring diagram for operating the device of Figure 2.

The conditions necessary for producing a thermonuclear reaction are quite well known and are disclosed in detail in the aforesaid copending application together with operating parameters of fusion reactors summarized hereinafter. In order to obtain such a reaction it is merely necessary to contain an appropriate volume of thermonuclear fuel at a high temperature whereby the fusion reaction occurs between colliding nuclei. Kinetic temperatures of the order of $10^8$ degrees Kelvin are necessary. To obtain a self-sustaining reaction a minimum volume of gas at a correlative density and pressure such that the energy produced in the system equals or exceeds the energy loss is required. However, such a reactor may be operated with a negative power balance if it is desired to employ the charged particle, radiation, plasma or other product for purposes other than power production. In thermonuclear reactions deuterium and tritium constitute preferred fuels which are subjected to (DD and TD) reactions for which 27 kev. is the ideal ignition temperature of the former and 3.4 kev. is the ideal ignition for a 50–50 mixture of the latter. These are the minimum temperatures at which the indicated reactions can be self-sustaining and an adequate excess thereover is necessary for net power output gain over input energy.

The basic mechanism whereby the pinch effect operates to contain a plasma is dependent upon the magnetic self-constricting or containment field which is produced by an electrical current flowing in a plasma, i.e., a highly or fully ionized gas. With space charge neutralization existing in the gas, mutual repulsion by like charges does not occur and the full compression effect of the generated field effects causes the charged particles to converge in increasing densities toward the center of the current distribution. To a first approximation the current magnitude required to produce such an effect is determined by the equation $$I^2 = 3.2 \times 10^{-7} NT$$

where $I$ = current in amperes
$N$ = total particles per unit length of current path
$T$ = temperature in kev.

Two types of classical pinch apparatus are in general use, i.e., linear and toroidal. In the former an electrical current discharge of appropriate magnitude is produced in an elongated insulating housing or tube containing, e.g., deuterium at reduced pressure by applying a high voltage across spaced electrodes therein. In the second type a toroidal housing is employed and the current is induced to flow in a preionized gas by an externally coupled winding which is usually a single turn primary. In modest size apparatus electrical currents of the order of $10^5$ to $10^6$ amperes or more may be utilized producing a constricting effect upon both electrons and ions as well as causing collisions therebetween which increase the temperature of the gas eventually resulting in temperature and density conditions whereat one of the foregoing nuclear reactions may occur. For certain other purposes lower temperatures and short containment times may be utilized.

In the operation of such classical pinch type apparatus it was found that the pinched or constricted discharge was not stable with reference to lateral displacement due to the rapid onset of an instability commonly referred to as the "kink" or "Kruskal-Schwarzschild" instability. As disclosed in detail in the aforesaid copending application a great increase in stability results by inclusion of a longitudinal magnetic field within the constricted plasma and by employing a conductive metal shell around the plasma. In general, for stability, the internal stabilizing field, $H_z$, must be equal to the self-constricting field, $H_\theta$. (The foregoing quantities are referred to as $B_z$ and $B_\theta$ in the aforesaid application.) For stabilization against "sausage" instability more than half of the internal pressure of the pinch must be due to included $H_z$ field. If longitudinal field can be excluded from the region external to the pinch, the pinch may be stable at radial compressions up to 5:1 for null plasma pressure and at compressions up to 2.5:1 for a plasma pressure equal to half of the pinch pressure. However, if $H_z$ external of the pinch is as much as ½ of the pinch field strength at the plasma surface the pinch becomes unstable at 1.8:1 compression even at null plasma pressure.

Certain other considerations as to containment, heating, apparatus details, circuits, etc. relating to the design and construction of the reactors disclosed in the aforesaid copending application are relevant to the construction of reactors in accordance with the present invention and such disclosure is therefore included by reference.

As noted above the external plasma conductivity will, in general, be sufficiently high to entrap any $H_z$ field external of the pinch and prevent uniform distribution within the tube. The exact shape of the $H_z$ distribution is determined by the variation of the boundary volume of $H_z$ at the tube wall as a function of compression. Without added $H_z$ the variation in time of the boundary value of $H_z$ will depend on the constant $\delta$ which is the ratio of the internal diameter of the insulating pinch tube to internal diameter of the $H_z$ generating coil or of a conductive shell surrounding the pinch tube. This region normally serves as a reservoir of $H_z$ flux which is gradually depleted during pinch compression as by movement inwardly.

The significant effect which an arbitrarily broad current distribution that results from the assumption of perfect conductivity everywhere within the walls can exert in the pinch boundary formation process is easily demonstrated. In practice perfect conductivity is quite closely approximated with high temperature plasmas. Consider the simplified graphical representation of a sidewall portion of the pinch tube illustrated in Figure 1 of the drawing with an external conducting (metal) wall at $x=-\epsilon$ and an insulator extending from $x=-\epsilon$ to $x=0$. As in an actual pinch discharge a perfectly conducting pressureless plasma is continuously generated at the insulating wall, $x=0$, e.g., by ionization of neutral gas boiling off or outgassing from the insulator surface due to the effects of the pinch discharge. This conductive plasma is continuously pulled away from the wall and into the tube as constriction of the plasma proceeds. Consequently, perfect conductivity exists everywhere inwardly from the wall of the tube. Considering $\epsilon$ small compared to the radius $R=1$ of the pinch tube, for all deformations of the order of $\epsilon$, radial convergence can be neglected and plane-parallel geometry assumed. The effects of particle inertia and pressure can be neglected since a small and slow compression is considered.

With the stabilized pinch method of operation, the entire region inwardly of the conducting wall is initially filled with a uniform longitudinal magnetic field $H_{zi}$ and no current flows within the plasma. As the axial electric field is applied an axial (pinch) current begins to flow along the plasma surface $x=0$ and is returned back along a conductor disposed around the tube wall. Simultaneously an $H_\theta$ (pinch) magnetic field is generated in the insulating space $-\epsilon \leq x \leq 0$. In order that the magnetic field pressure in this space may not rise and cause imbalance across the plasma surface, the plasma must move inwardly and away from the insulating wall surface. The rate of the indicated plasma movement can be related to the rate of rise of the $H_\theta$ field which itself, of course, is directly dependent upon the current produced by the applied axial electric field. Time-dependence of phenomena is not of direct interest in the present consideration since it is the shape of successive equilibrium configurations which are of primary interest and these are not dependent on the rate of formation.

When plasma near the tube wall is caused to drift inwardly the plasma everywhere from $x=0$ to $x=\infty$ must drift by exactly the same amount otherwise the magnetic field would be compressed locally which would be incompatible with pressure balance. Therefore, inwardly from the original plasma surface, the $H_z$ distribution remains completely unchanged. Outwardly from the plasma surface a mixed $H_\theta - H_z$ distribution exists and is to be calculated. Once an $H_z$ value is determined at a given plasma point the $H_\theta$ value is fixed as indicated by the following equation:

(I) $$H_\theta^2 + H_z^2 = H_{zi}^2$$

Furthermore both the $H_z$ and $H_\theta$ values must remain constant at a given plasma point since there is no compression, only drift, and no diffusion. Thus the entire distribution can be characterized by specifying $H_z$ as a function of position in the plasma as in terms of a co-ordinate $s-x$ measured from the original plasma surface and is located at $x=s$ at a subsequent stage during the discharge. Thus $H_z(0)$ is the field at $x=s$ and $H_z(s)$ is the field at $x=0$. The function of $s-x$, which $H_z$ must be, follows from conservation of $H_z$ flux between $x=-\epsilon$ and $x=s$ represented as (II) $$\epsilon(H_{zi} - H_z(s)) = \int_0^s dx H_z(s-x)$$

which may be solved to give (III) $$H_z = H_{zi} \exp \frac{x-s}{\epsilon} \quad 0 \leq x \leq s$$

where the boundary condition $H_z = H_{zi}$ at $x=s$ has also been used. The distribution of the $H_\theta$ then follows as (IV) $$H_\theta = H_{zi}\left[1 - \exp 2\frac{x-s}{\epsilon}\right]^{1/2}$$

and the current density is given by (V) $$j = [j_\theta^2 + j_z^2]^{1/2}$$

wherein (VI) $$j_\theta = \frac{dH_z}{dx} = \frac{H_{zi}}{\epsilon} \exp \frac{x-s}{\epsilon}$$

and (VII) $$j_z = -\frac{dH_\theta}{dx} = \frac{H_{zi}}{\epsilon} \exp 2\frac{x-s}{\epsilon}\left[1 - \exp 2\frac{x-s}{\epsilon}\right]^{1/2}$$

so that (VIII) $$j = \frac{H_{zi}}{\epsilon} \exp \frac{x-s}{\epsilon}\left[1 - \exp 2\frac{x-s}{\epsilon}\right]^{-1/2}$$

Setting $$\frac{s}{\epsilon} = 3$$

the distribution illustrated in Figure 1 is obtained and indicates the manner in which a current distribution having a width $\sim \epsilon$ can be formed in a plasma despite the assumption of perfect conductivity. If the resistive diffusion effect is included the resulting distribution will always be broader; however, it is important to be aware that the final pinch distribution is produced by two separable physical phenomena. The resistive diffusion is determined by electrical conductivity, dimension and time whereas the external conductivity effect depends upon the particular boundary value of $H_z$ as a function of compression.

The regime just calculated was determined by an initially given value of external axial field flux equal to $\epsilon H_{zi}$. Operations need not be limited to this boundary condition but $H_z$ at $x=0$ can be programmed or manipulated to be any arbitrary function of compression or of $H_\theta$ so that more favorable and highly interesting distributions can be entrapped or produced. The infinitely sharp boundary case is formed by a program such that the $H_z$ line of force at the insulator wall ($x=0$) remains stationary while $H_z^2$ pressure is replaced with $H_\theta^2$ pressure, i.e., the boundary condition to be maintained in order to generate the infinitely sharp boundary entrapped distribution is (IX) $$H_z^2 + H_\theta^2 = H_{zi}^2$$

wherein $H_z$ is decreased from the initial value $H_{zi}$ to some desired final value $H_{zf}$ which may be for example zero or negative. Other cases of great importance involve the entrapment of magnetic fields which represent complex $H_z$ functions such as multiple oscillations with complete field reversal. In practice the desired distributions are obtained by appropriately applying magnetic fields from sources which are controlled or programmed as a function of $H_z$ and/or $H_\theta$ or of the circuits producing such fields.

In order to study such questions more realistically, it is necessary to depart from the plane-parallel, low compression approximation given above and to develop the general theory of how a cylindrically symmetric field distribution entrapped in infinite conductivity plasma is reshaped under adiabatic radial compression or expansion. The possibility of non-zero plasma pressure has been included, since it is easy to do so. The appropriate equations are $$(\text{X}) \qquad \frac{\partial \vec{H}}{\partial t} = \nabla \times \vec{E}$$

$$(\text{XI}) \qquad \vec{E} = -\vec{v} \times \vec{H}$$

$$(\text{XII}) \qquad (\nabla \times \vec{H}) \times \vec{H} - \nabla p = 0$$

$$(\text{XIII}) \qquad p = Cn^\gamma$$

$$(\text{XIV}) \qquad \frac{\partial n}{\partial t} + \nabla \cdot (\vec{vn}) = 0$$

where $p$ is the plasma pressure and $n$ its density. The first two equations (X and XI) may be combined to give $$(\text{XV}) \qquad -\frac{\partial H_z}{\partial t} = \frac{1}{r}\frac{\partial}{\partial r}(rvH_z)$$

$$(\text{XVI}) \qquad -\frac{\partial H_\theta}{\partial t} = \frac{\partial}{\partial r}(vH_\theta)$$

since the only non-vanishing component of $\vec{v}$ is the radial velocity $v$. It is helpful to define the quantities $$(\text{XVII}) \qquad \phi_z = \int_0^r H_z r_1 dr_1$$

$$(\text{XVIII}) \qquad \phi_\theta = \int_0^r H_\theta dr_1$$

Eliminating $v$ from Equations XV and XVI, one obtains simply $$(\text{XIX}) \qquad \frac{\partial \phi_z}{\partial r}\frac{\partial \phi_\theta}{\partial t} - \frac{\partial \phi_z}{\partial t}\frac{\partial \phi_\theta}{\partial r} = 0$$

which implies that $\phi_\theta$ can be expressed *as a function of* $\phi_z$ only.

$$(\text{XX}) \qquad \phi_\theta = \phi_\theta(\phi_z)$$

By differentiating Equation XX with respect to $r$, one can show that $$(\text{XXI}) \qquad H_\theta = r\mu H_z$$

where $$(\text{XXII}) \qquad \mu = \frac{d\phi_\theta}{d\phi_z}$$

is also a function of $\phi_z$ only. Equation XXI states that if one follows a particular plasma point (that is, a point of constant $\phi_z$) during compression, then the slope $$\frac{H_\theta}{H_z}$$

at that point diminishes like $r$. In other words, the two-dimensionally compressed $H_z$ field increases more rapidly than the one-dimensionally compressed $H_\theta$ field.

In cylindrical coordinates, Equation XIV becomes $$-\frac{\partial n}{\partial t} = \frac{1}{r}\frac{\partial}{\partial r}(rvn)$$

which may be combined with Equation XV to give $$(\text{XXIII}) \qquad \frac{\partial \phi_z}{\partial r}\frac{\partial N}{\partial t} - \frac{\partial \phi_z}{\partial t}\frac{\partial N}{\partial r} = 0$$

where $$(\text{XXIV}) \qquad N = \int_0^r n r_1 dr_1$$

It follows that $N$ can be expressed as a function of $\phi_z$ only. The analogue of Equation XXI is $$(\text{XXV}) \qquad n = g H_z$$

where $$(\text{XXVI}) \qquad g = \frac{dN}{d\phi_z}$$

represents a function of $\phi_z$ only.

The infinite electrical conductivity plasma under consideration is naturally one of negligible thermal conductivity. Thus each infinitesimal plasma volume is compressed adiabatically, and the quantity $C$ in Equation XIII must be a constant at a particular plasma point. Consequently $C$ can be expressed as a function of $\phi_z$ only. The pressure balance Equation XII can now be written $$(\text{XXVII}) \qquad H_z \frac{dH_z}{dr} + \frac{H_\theta}{r}\frac{d}{dr}(rH_\theta) + \frac{dp}{dr} = 0$$

or $$(\text{XXVIII}) \qquad \frac{1}{r}\frac{d\phi_z}{dr}\frac{d}{dr}\left(\frac{1}{r}\frac{d\phi_z}{dr}\right) + \frac{\mu}{r}\frac{d\phi_z}{dr}\frac{d}{dr}\left(r\mu\frac{d\phi_z}{dr}\right) + \frac{d}{dr}C\left(\frac{g}{r}\frac{d\phi}{dr}\right)^\gamma = 0$$

from which $$(\text{XXIX}) \qquad \frac{d^2\phi_z}{dr^2}(1 + r^2\mu^2 + Sg^2) - \frac{1}{r}\frac{d\phi_z}{dr}(1 - r^2\mu^2 + Sg^2)$$
$$+ \left(\frac{d\phi_z}{dr}\right)^2\left\{\frac{1}{2}r^2(\mu^2)' + Sg^2(\log gC^{1/\gamma})'\right\} = 0$$

where $$S = \gamma C\left(\frac{g}{r}\frac{d\phi}{dr}\right)^{\gamma-2}$$

and the primes denote differentiation with respect to $\phi_z$. When the plasma region under consideration is that external to the pinch proper, the particle pressure can be neglected, so that $g = 0$ and Equation XXIX becomes $$(\text{XXX}) \qquad \frac{d^2\phi_z}{dr^2}(1 - r^2\mu^2) - \frac{1}{r}\frac{d\phi_z}{dr}(1 - r^2\mu^2) + \frac{1}{2}r^2(\mu^2)'\left(\frac{d\phi_z}{dr}\right)^2 = 0$$

Note that the preceding equations are true ordinary differential equations, since time has been eliminated from the problem as an independent variable. Evidently, time does not enter in any material way, and the successive equilibrium configurations are not affected by the actual rate of compression or expansion. Of the two boundary conditions for Equation XXIX or XXX the first is simply $\phi_z = 0$ at $r = 0$. The second boundary condition is most conveniently set in terms of a condition on $$H_z = \frac{1}{r}\frac{d\phi_z}{dt}$$

at some radius, such as $r = 0$. The magnitude of $H_z$ at such a point serves to label the stage of compression or expansion and so takes the place of time as historical parameter.

An ordinary second-order differential equation of the type of Equation XXIX or XXX is easy to solve numerically, provided that $\mu$, $g$ and $C$ are known as functions of $\phi_z$ over the interesting range of $\phi_z$. Thus it is always possible to begin with some distribution over the pinch tube and deduce all earlier stages, at least in the ideal limit of infinite conductivity. This is done by recording $\phi_z$, $\mu$, $g$, and $C$ as functions of $r$ for the distribution in question and combining these data in the form of tabulations of $\mu$, $g$ and $C$ vs. $\phi_z$. All four of these variables will become different functions of $r$ at different stages of compression, but the same functional dependence on $\phi_z$ is maintained. It therefore merely remains to calculate specific distributions for selected boundary values $H_z$, by means of Equation XXIX or XXX.

A more difficult problem is to begin with a known distribution plus an extra boundary condition at the pinch tube wall, and to calculate the distribution of subsequent stages of compression. If $\phi_{z0}$ is the z-flux initially included in the tube, then $\mu$ and $g$ are known as functions of $\phi_z$ for $0 \leq \phi_z \leq \phi_{z0}$. For $\phi_z > \phi_{z0}$ one cannot simply use Equation XXIX or XXX, but must also make use of the information contained in the extra boundary condition.

As an example, consider the problem of compressing the null-$\beta$, uniform $H_z$ distribution which was treated earlier in the plane approximation. Let the insulating tube thickness be $\epsilon$ and let $$\epsilon_1 = \epsilon + \frac{\epsilon^2}{2}$$

where the tube inside radius is taken as unity. The z-flux conservation requires that at $r=1$ (XXXI)   $\epsilon_1 \dfrac{d\phi_z}{dr} + \phi_z = \left(\dfrac{1}{2} + \epsilon_1\right) \phi_{z0}$ One must now proceed as in the case of a partial differential equation, by calculating the distribution at each stage of compression with the aid of the distribution at the immediately preceding stage. For $0 \leq \phi_z \leq \phi_{z0}$ the calculation is trivial, since $\mu$ remains identically zero in this interval. Let us suppose a field distribution at some $n$th stage of compression such that $r=1$, $\phi_z = \phi_{zn} > \phi_{z0}$. Then for all subsequent stages the field distribution can at least be calculated in the interval $\phi_{x0} \leq \phi_z \leq \phi_{zn}$ by means of Equation XXX. At the $(n+1)$th compression stage, the condition $\phi_z = \phi_{zn}$ is necessarily reached somewhat short of $r=1$. At this point the extra boundary condition given by Equation XXXI is invoked to extend the $\phi_z$ vs. $r$ curve to a new limiting value $\phi_{zn+1}$ at $r=1$.

Apparatus in which a stabilized pinch discharge may be produced in accordance with the teachings of the invention may be of the linear, toroidal or more complex tubular pinch tube types. In general, such apparatus will therefore include pinch discharge tube means, i.e., a tubular housing formed of a magnetic field permeable insulator material of either a linear cylindrical or generally toroidal configuration and provided with evacuation and gas supply means for introducing the gaseous atmosphere in which the discharge is to be produced. In the linear pinch tube device, electrical current supply means are provided for generating a linear current discharge between electrodes longitudinally within the tube and in the toroidal device the electrical supply means is coupled inductively through single turn solenoid means to obtain the discharge. Means including a solenoid or other current carrying means are provided for supplying a stabilizing $H_z$ within the tube in a manner similar to that disclosed in the aforesaid application; however, in accordance with the present invention the arrangement of such solenoid or of the current source employed to supply the energizing current to such solenoid is modified so that the $H_z$ field is either an appropriately programmed or a self-programmed function of compression whereby a sharply defined boundary, otherwise stabilized boundary or any desired selectively stabilized boundary is produced in the pinch discharge. Alternatively, a separate programmed $H_z$ field solenoid may be employed. Ordinarily, the device will also include means for inducing initial ionization of the gas to facilitate or initiate formation of the discharge especially if rapid formation and compression of the plasma is desired.

The linear pinch tube apparatus 10 illustrated in Fig. 2 of the drawing may be incorporated in appropriate circuits and operated in accordance with the foregoing principles. Apparatus 10 is constructed with an elongated cylindrical tube 11 of quartz, Pyrex, ceramic, or other insulating material closed terminally with upper 12 and lower 13 plug electrodes between which the pinch discharge is formed. The lower electrode 13 is extended downwardly providing a neck portion 14 and is provided with a flanged portion 16 having an outwardly projecting terminal 17 to which one conductor of transmission line 18 is coupled as disclosed below. A shoulder 19 above neck 14 supports gasket 20 which in turn provides support for the lower end of tube 11. The electrode 12 is provided with a flanged portion 25 extending outwardly against which gasket 21 and the upper end of tube 11 bear. A longitudinally split cylindrical return conductor 22 is attached to the peripheral rim of flange 25 of upper electrode 12 and extends in spaced concentric relation along tube 11 to terminate in flange 23 which is spaced from lower electrode flange 16 by means of insulator sheet 24. Flange 23 is provided with outwardly projecting terminal 26 to which the second conductor of transmission line 18 is connected completing the electrical discharge circuit of the apparatus 10.

A fitting 27 is provided in electrode 12 for coupling to evacuation and gas supply means (not shown) for removing extraneous atmospheres and introducing a desired atmosphere, e.g., deuterium or deuterium-tritium mixtures. A spark plug type trigger 28, mounted in a perforation in electrode 12 comprising a tungsten electrode 29 contained in insulating sheath 30 terminating at the lower face of electrode 12 and extending outwardly through vacuum seal 31, is coupled with conductor 32 to an external electrical pulse generator (described below). The trigger circuit is employed to produce initial ionization by discharge to electrode 12 and facilitate formation of the pinch discharge in the device.

A probe 33 including an elongated quartz tube 34 sealed at the lower end is supported within a perforation formed centrally in electrode 12 by collar 36 sealed thereto which collar is in turn supported by the upper end of Sylphon bellows 37 which is sealed at the lower end to electrode 12. With this arrangement, probe 33 may be manipulated into various positions within tube 11. A type of magnetic pickup coil utilized in probe 33 is illustrated in Fig. 3 of the drawing and includes, e.g., coil 38 of 52 turns of 0.003" copper wire wound on a 1 mm. quartz rod 39 over 2 mm. length and with 2.5 m. outside diameter. Terminals 41 lead outwardly to suitable monitoring or display apparatus (not shown) described below.

A self-supporting solenoid 42 provided by embedding a helical conductor 43 in fiberglass cloth contact pressure laminating resin (Epon) laminate 44 is arranged concentrically about return conductor 22 in order to provide stabilizing $H_z$ field as taught in the aforesaid copending application; however, as described hereinafter, such solenoid 42 may also be excited to provide an $H_z$ field boundary condition programmed as a function of compression. An $H_z$ programming solenoid 46 comprising heavy braid or strip conductor wound on tube 11 may also be employed for programming the $H_z$ field as hereinafter described. Means for measuring current in the tube may be provided by disposing a solenoid 47 circumferentially oriented within an annular space 48 provided between neck 14 of electrode 13 and flange 23. Conductors 49 led exteriorly may then be coupled to conventional instruments to measure the current produced therein by changing flux fields in the region indicated.

A simplified typical circuit employed for operating the linear pinch tube 10 is schematically illustrated in Fig. 4 of the drawing. The basic operating procedure requires application of stabilizing $H_z$ field immediately prior to formation of the pinch discharge in order to trap the stabilizing $H_z$ field therein. To provide the pinch current transmission line 18, which supplies electrodes 12 and 13, is coupled across capacitor bank 51 which will, in general, comprise several high voltage condensers and switching tubes in parallel arrangement. Capacitor bank 51 is charged through a vacuum switch 52 by power supply 53. The high voltage pinch current is switched by ignitron 54 having the anode 56 coupled to one side of the transmission line and the cathode pool 57 to one side of condenser bank 51.

A sequentially timed switching arrangement may be employed to apply the $H_z$ exciting current to terminals 58 and 59 of solenoid 42 through transmission line 61 from a capacitor bank 62 indicated as a single condenser. Multiple ignitrons for switching capacitors 62 in a parallel arrangement corresponding to single ignitron 63 with the anode 64 coupled to one terminal of bank 62 and cathode pool 66 to one conductor of the transmission line 61 is employed for such switching. The second conductor of the line 61 is coupled to the second terminal of the condenser bank. Power from supply 67 is applied through vacuum switch 68 to charge bank 62. A second ignitron 69 with the anode 71 coupled to second conductor of line 61 and cathode pool 70 coupled to the first conductor of line 61 is triggered as described below to cause "crow-barring" or shorting of solenoid 42 and exponential decay of the field following energization by bank 62.

Variable sequential operation of the foregoing circuits is obtained as by applying an initiating pulse from a multiple channel pulse initiator unit 72 through a variable time delay unit 73 and pulser 74 to igniter 76 of ignitron 63 causing bank 62 to discharge through solenoid 42. At a selected time a pulse supplied by another channel of delay unit 73 is subsequently applied through pulser 77 to igniter 78 of ignitron 69 causing the aforementioned "crow-barring" action and establishment of the initial $H_z$ field at the desired level. A simultaneous initiating pulse is applied from initiator 72 through a channel of variable time delay unit 79 to pulser 81 which applies an ionizing pulse between electrode 29 of trigger 28 and pinch tube electrode 12 thereby providing favorable ionized gas conditions for the pinch discharge to occur between the pinch tube electrodes 12 and 13. At a time determined by the setting of a second channel in unit 79 shortly thereafter a pulse is applied through pulser 82 to igniter 83 of ignitron to cause discharge of bank 51 between electrodes 12 and 13 providing the pinch discharge in tube 11 which traps the initial stabilizing field $H_z$ therein.

Various experiments were performed employing the basic apparatus and circuitry described in the foregoing with specific structural details, dimensions, and specifications noted hereinafter.

Tube 11 _____ 2.718 inches I.D.
Elec. 12—13 _____ 16.875 inches' spacing.
Solenoid 43 _____ 170 turns No. 8 Cu wire.
Condenser bank 51 _____ 150 mfd.
Condenser bank 51 _____ 10 kilovolts.
Initial field $H_z$ _____ 4600 gauss.
Initial deuterium pressure ____ 200 microns Hg.

Results were determined for various radial positions of probe 33 with the signal being integrated with an RC circuit and then displayed on an oscilloscope screen as a function of time. Sufficient pulses were observed at each position to insure reproducibility of results. A final field plot at a given time was subsequently determined from the time history of the field at each point.

Figure 6:
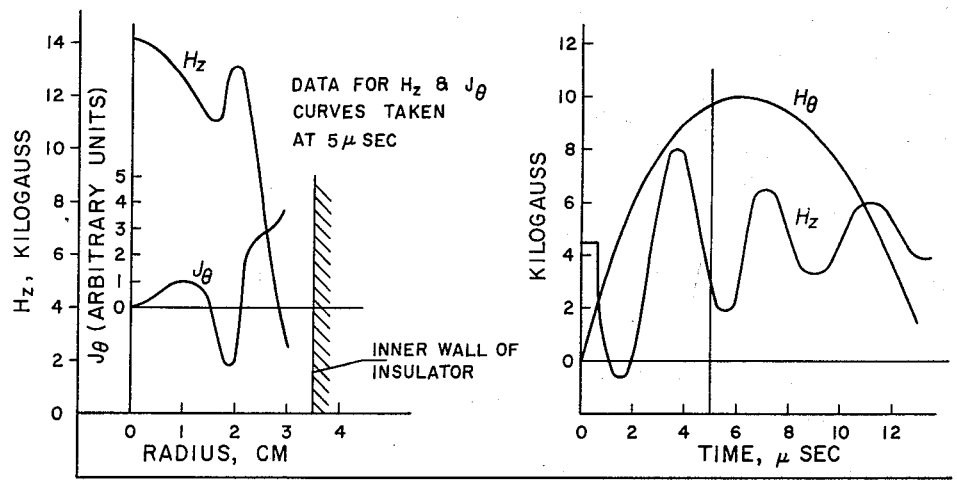
Figure 6 is a graphical illustration of a stabilized axial field distribution obtained with an oscillating $H_z$ field.

A series of determinations were made by varying the distance $\epsilon$ between flux conserving electrode 22 and inside surface of the wall of tube 11 with the results illustrated in Fig. 6 of the drawing. The indicated values are those existing at peak pinch current which in most cases occurred close to 5 $\mu$sec. after start of the pinch. The broadening effect on the $H_z$ distribution with increasing insulator thickness $\epsilon$ is apparent. The width of the field distribution in the case of the minimum insulator thickness ($\epsilon=0.01$) is obviously much greater than the $\epsilon$ space itself so that in this instance the width of the distribution must be governed by diffusion. However, this diffusion distance is in turn considerably smaller than the width of the distribution obtained with the largest insulator space ($\epsilon \cong 1$) so that in the latter case the distribution is governed by the wall boundary condition.

To illustrate how an arbitrary distribution can be created independently controlling $H_z$ at the wall as a function of $H_\theta$, a fast condenser (not shown) was coupled across terminals 84 and 86 of solenoid 46 and allowed to oscillate during the rise of the $H_\theta$ field produced by the pinch discharge. The resultant magnetic field behavior at the wall boundary and the resultant spatial distributions of field and pinch current $J_\theta$ are shown in Fig. 6 of the drawing. During the formation of the pinch discharge the $H_z$ field at the wall started at a high value, diminished to zero, increased to the original value and again diminshed to zero. The field distribution shown occurred at the time $H_z$ approached zero for the second time. It was expected that if the space external to the pinch were conducting, then the second positive peak in the $H_z$ field would be clearly trapped in the external plasma as a peak in the spatial distribution of the $H_z$ field. The second peak in the observed radial distribution confirms the basic accuracy of the concept of external conductivity and the foregoing operation indicates a general method in which the field distribution can be modified or desired field distributions created by the trapping of $H_z$ field in the external plasma.

A highly useful program of $H_z$ as a function of compression is that in which the boundary value at the wall is reduced to zero in a time period which is short compared to the rise time of $H_\theta$ and remains at zero during occurrence of the pinch. With small size apparatus such as the foregoing appropriate accessory programming circuitry is difficult to design due to the very small time periods available; however, with large size equipment appropriate equipment controlled by current flow or magnetic field detectors such as the solenoid 47 may be provided. The $H_z$ programming solenoid 46 was coupled across the transmission line 18 in self-programming fashion such that some of the bank 51 current flows therethrough and tends to reduce the value of $H_z$ exterior of the pinch at the wall thereby approximately an accessorily programmed operation.

Figure 5:
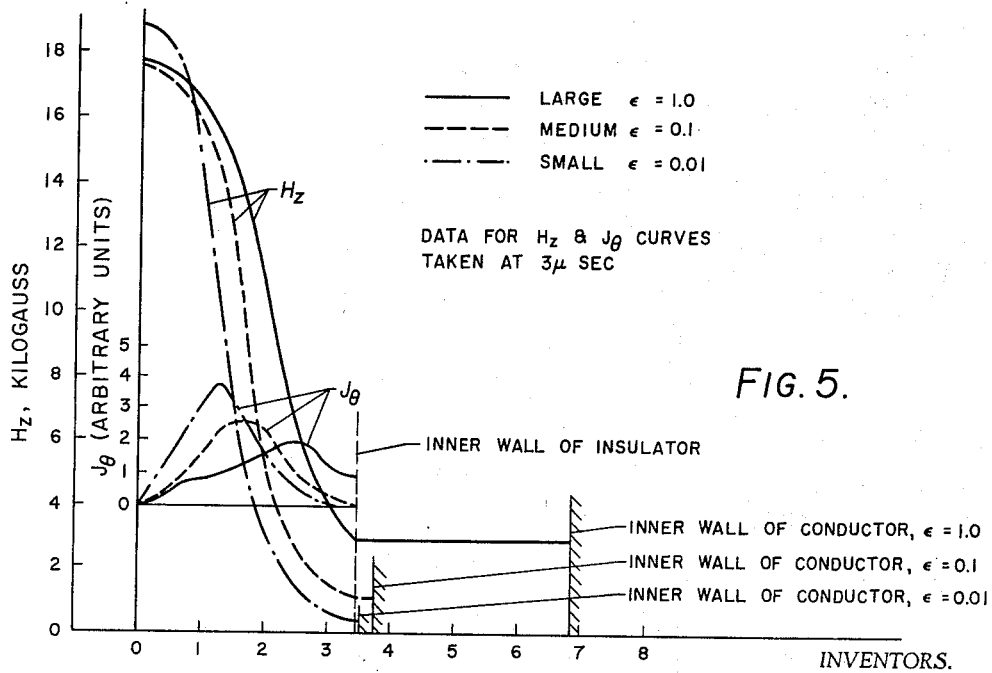
Figure 5 is a plot of a stabilized pinch axial field distribution as a function of insulator thickness $\epsilon$.
Figure 7:
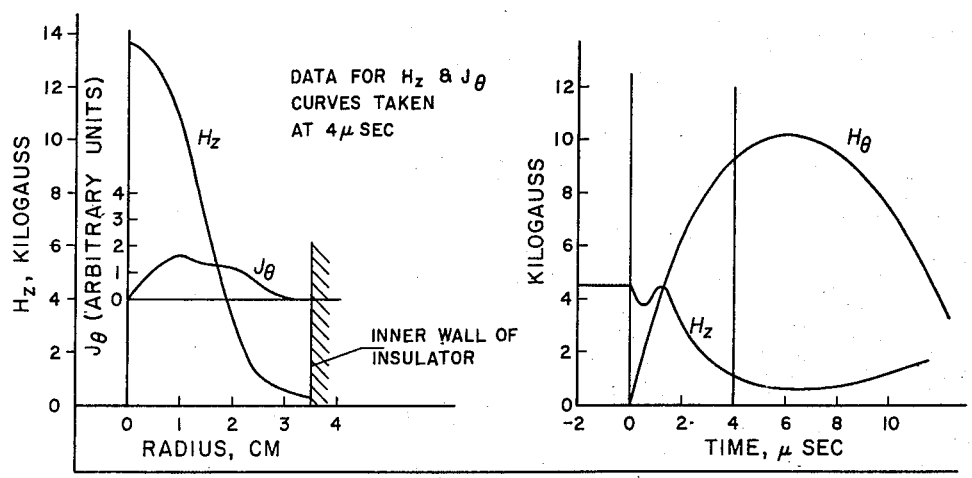
Figure 7 is a graphical illustration of a stabilized pinch axial field distribution employing a self-programmed $H_z$ circuit arrangement.

Results obtained by this method of operation are illustrated in Figure 7 of the drawing indicating the behavior of $H_z$ at the wall as a function of time together with the $H_z$ distribution in space. If no such energization of solenoid 46 were employed the distribution would have been identical with the case of largest $\epsilon$ in Figure 5. The more rapid reduction in boundary value of $H_z$ in the present instance clearly produced a narrower and improved field distribution and demonstrates the benefits which result from "programming out" the $H_z$ flux external to the pinch proper to obtain the sharper $H_z-H_\theta$ field separations.

In view of the foregoing field behavior, the effect of applying excess negative $H_z$ field was investigated and it was found that by driving the $H_z$ field strongly negative, i.e., applying a strong field having reverse orientation to initial $H_z$, an $m=1$ instability is produced in such a direction that the $H_z$ field at the center of the tube is reduced. Accordingly, this discovery provides a powerful means of modifying magnetic fields within the discharge itself so as to modify conditions during various stages of the discharge to provide a variety of useful results, especially in the shaping of magnetic field boundaries within a plasma as described in more detail hereinafter.

A very interesting application of the concepts of the invention is demonstrated in an arrangement in which a small axial field component is trapped external to the main plasma column of a dynamic pinch (no initial $H_z$ field) discharge and is compressed to high values (comparable to the primary pinch field $H_\theta$). The entrapped external field suppresses the $m=0$, sausage instability and enhances the $m=1$, helical instability mode yielding longer containment times and reducing spurious neutron yields from the $m=0$ mode thereby simplifying study or use of the true thermonuclear reaction occurring in the discharge. The large non-thermonuclear yield from the rapid growth of $m=0$ instabilities masks the true yield and the discharge breakup at the time of the second and third magneto=hydronomic bounces of the dynamic pinch discharge prevents adiabatic heating with further rises in pinch currents. Since the dynamical heating may reach 200 e.v. which is only a factor of about 2 below which thermonuclear reactions begin to occur at a substantial rate (800 e.v.) even a slight increase in containment time would be of considerable merit.

The possibility of stabilizing a pinch against $m=0$ instabilities by adding an external field has been contemplated heretofore and been considered impractical due to large energy requirements. However, the value of external $H_z$ field necessary to materially delay breakup is equivalent to the maximum $H_\theta$ pinch field. Since the pinch field diminishes as $1/r$ and it was assumed that the $H_z$ field would be of a uniform value from the insulator wall to the pinch boundary it was evident that a very large fraction of the total energy applied to the system would be in the external $H_z$ field as illustrated in Figure 8 of the drawing. A pinch of this configuration for a 10:1 compression ratio, i.e., initial to final radius, requires 12 times as much magnetic energy as one without $H_z$ field to contain a plasma under similar NKT conditions. By trapping $H_z$ flux in the external plasma and applying compression thereto to obtain the required $H_z$ field intensity only modest increases, e.g., a factor of 1.7 in the 10:1 compression case considered below, are needed to give significantly increased containment times over the standard pinch. With higher compression ratios the energy comparison becomes even more favorable. The new type of discharge has been termed the "screw dynamic pinch" or partly stabilized pinch for reasons apparent hereinafter.

If $$\frac{H_\theta}{H_z}=10$$

when the plasma initially leaves the wall $H_\theta=H_z$ when a 10:1 compression ratio occurs. The boundary value will of course modify this relation but if the simple condition $$\frac{H_\theta}{H_z}$$

is maintained constant a simple distribution results. The distribution values for $H_z$ and $H_\theta$ may be calculated from the formulas $$H_z = H_{z0}\left(\frac{1+\mu^2 r_0^2}{1+\mu^2 r^2}\right)$$

$$H_\theta = r\mu H_{z0}\left(\frac{1+\mu^2 r_0^2}{1+\mu^2 r^2}\right)$$

wherein $r_0$=original radius, $r$=peak plasma boundary radius and $\mu$=compression ratio. With $H_\theta=H_z$ at the pinch surface $$\frac{r_0}{r_1}=10:1$$

$\mu=10$, where $r_1$=tube radius the screw dynamic pinch distribution of Figure 9 is obtained. Calculations indicate that the screw dynamic pinch should be stable by a factor of at least about 5 over the standard dynamic pinch.

The screw dynamic pinch configuration can be produced by simply utilizing a standard linear pinch tube in which the return conductor is divided into insulated segments slanted along a helical path of shallow pitch. The apparatus of Figure 2 with solenoids 42 and 46 removed and return conductor 22 modified may be so employed; however, the modified version 100 illustrated in Figure 10 of the drawing was employed with a modified power supply in a wide variety of operations.

A quartz tube 101 having upper 102 and lower 103 terminal flanges was provided with upper 104 and lower 106 reentrant electrodes to serve as a pinch tube. Electrode 104 is provided with a flange 107 projecting outwardly and bearing on O-ring 108 resting on the upper face of tube flange 102 for sealing. Electrode 106 is likewise provided with a flange 109 projecting outwardly and bearing on O-ring 111 resting against the lower face of tube flange 103. Flange 109 is extended in an edge area and connected to conductor 112 of a transmission line 113 and is provided with conduit 114 leading to a gas supply system (not shown). The outer edge of flange 107 of electrode 104 is attached to a return conductor 116 formed as a series of insulated braid strips 117 extending in closely spaced helical parallel paths along tube 101 and terminating in a lower ring 118 employed as a terminal. Ring terminal 118 is extended as conductor 119 of transmission line 113 separated from conductor 112 by insulator 121. Upper electrode 104 is fitted with conduit 122 leading to a vacuum pump system (not shown) and with a probe 123 oriented to determine $H_z$ at desired locations in tube 101 somewhat as above. A $\theta$ oriented magnetic coil probe 124 was employed adjacent the lower side of flange 102 and external $H_z$ oriented loop 126 was disposed, radially about central regions of tube 101 exteriorly of conductor 116. Loop 127 oriented coplanar with the longitudinal axis of tube 101 and disposed exteriorly of conductor 116 was used to determine wall axial field flux changes. In the model employed in experiments described below, conductor 116 was formed of 27 strips 117 and tube 101 was of 10 cm. I.D. with a 20 cm. spacing between electrodes 104 and 106. Each strip made about 1/10 turn around tube 101. A spark trigger (not shown) similar to that described above was also employed. Power was applied to transmission line 113 from a switched condenser bank somewhat as above (not shown). The condenser bank comprised 20 capacitors of 7.5 mfd. each connected 5 in a series string with 4 strings paralleled yielding 6 mfd. effective in a Marx type circuit. 20 kilovolt charging potential was available; however, 12 to 14 kilovolts per capacitor was used. Individual triggered air spark gaps were employed between each pair of series capacitors and the load which gaps were triggered simultaneously by simultaneous pulses applied to trigger electrodes.

With the foregoing arrangement of return conductor 116 $H_z$ field proportional to both the pinch current and pitch angle or degree of conductor twist is generated near the tube wall. Therefore $H_\theta$ and $H_z$ external of the pitch assume a certain fixed ratio near the tube wall dependent only upon the twist angle of return conductor 116. The field configuration illustrated in Figure 11 results from the arrangement shown. With reference to Figure 12

$$\frac{dI}{dt}$$

was measured with a current loop coupled to a current feed line, $$\frac{d\phi_z}{dt}$$

measured with loop 126 is a measure of total axial field flux inside the return conductor 116, $H_z$ wall by probe 124, and $H_z$ axial by probe 123. Gamma ray and neutron fluxes were determined with scintillation counters (not shown). The voltage across the tube was measured with a standard voltage dividing resistor (not shown).

Figure 14:
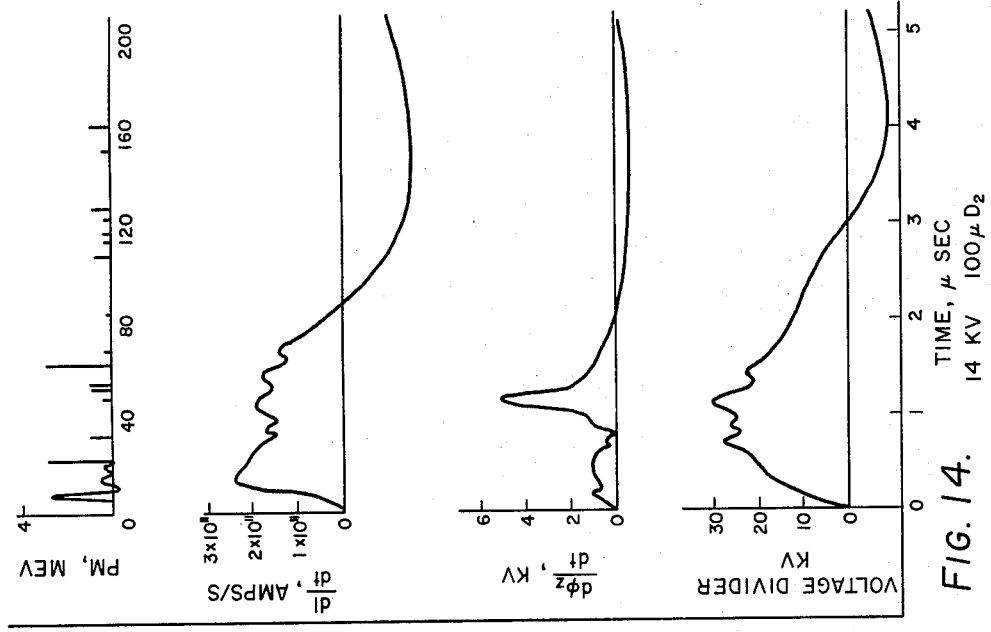
Figure 14 illustrates typical oscilloscopic traces of various measurements of a screw dynamic pinch in hydrogen.
Figure 13:
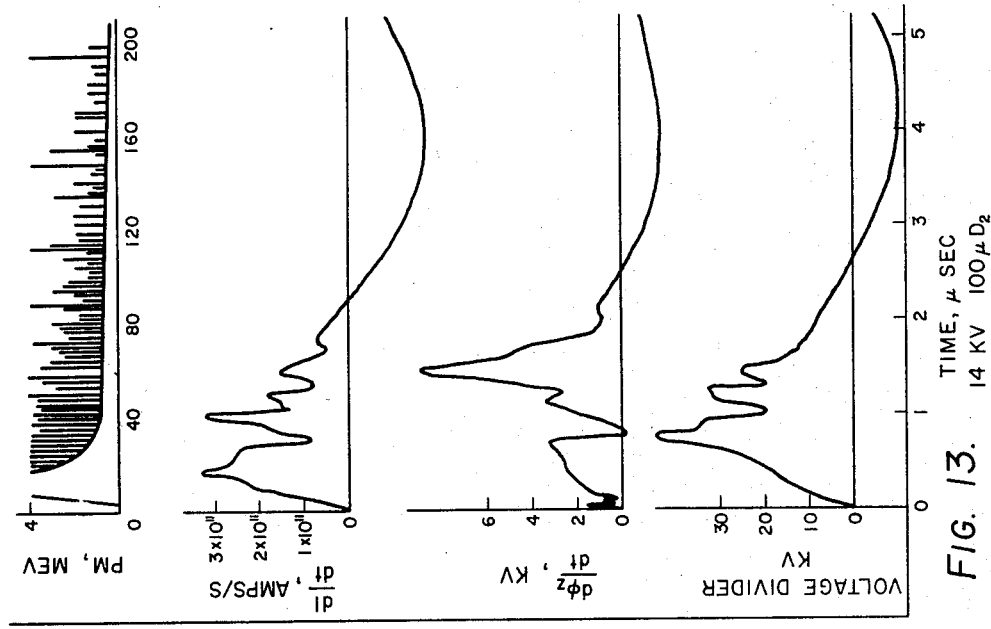
Figure 13 illustrates typical oscilloscopic traces of various measurements made on a screw dynamic pinch in deuterium.

Figure 13 shows typical traces of the signals of a screw dynamic pinch for 14 kv. on each capacitor (70 kv. all) and 100-micron deuterium pressure. The top trace is a long-time signal from a large (8-in. diameter) scintillation counter surrounded with additional paraffin, located immediately against the pinch tube. The many pulses observed at 50–100 μsec., with the characteristic decay of approximately 100 μsec., furnish unique identification of the thermal-neutron capture in hydrogen. by making observations for a long time (100 μsec.) after the pinch discharge, one cannot possibly confuse these pulses with electrical pickup signals. Figure 14 shows the same trace for hydrogen with the large resultant decrease in neutron yield. The slight residual deuterium gives rise to a few neutrons. The $$\frac{dI}{dt}$$

signal is typical of dynamic pinches; the oscillations are caused by changes of inductance due to magnetohydrodynamic bouncing and instabilities. The first bounce occurs in 0.7 μsec., in agreement with theory. The $$\frac{d\phi_z}{dt}$$

signal during the initial bounce agrees in magnitude with that expected from the observed $$\frac{dI}{dt}$$

signal and the pitch of the return conductor. More particularly, in accordance with theory, as shown by the following equations:

(XXXII)
$$\frac{dH_z \text{ wall}}{dt}=\frac{1}{10}\frac{dH_\theta}{dt}=\frac{1}{10}\frac{1}{5R}\frac{dI}{dt}$$

Therefore (XXXIII)
$$\frac{d\phi_z}{dt}=\frac{R^2\times\frac{dI}{dt}\times 10^{-8}}{10\times 5R}$$

If $R=7$ cm. and $dI/dt=2\times 10^{11}$ amp./sec. at first bounce, (XXXIV)
$$\frac{d\phi_z}{dt}=1.85\times 10^3 \text{ volts}$$

This is in good agreement with the measured values just before first bounce. A short time later, however, the $d\phi_z/dt$ signal increases by roughly 5 times. The signal is interpreted as the growth of the $m=1$ "corkscrew" instability.

If the total current remains roughly constant (the $dI/dt$ signal being less than at the start of the pinch), then the only way for the $\phi_z$ flux to change by a large factor is by means of a change in the current configuration. The return braid conductors are fixed in space, so that the only part of the current circuit that can move through large dimensions within the small time available is the pinch configuration itself. In order that the pinch give rise to a change in the $\phi_z$ flux external to the tube, the current of the pinch must wrap up into a helix, in such a direction as to give rise to a negative $H_z$ outside the pinch and inside the braid. The leakage of a small fraction of this reverse $H_z$ field through the slots in the braid gives rise to the observed large positive $d\phi_z/dt$ external signal. Figure 12 shows the helical pinch configuration and the leakage flux linking the single-turn loop with the resultant $d\phi_z/dt$.

Figure 15:
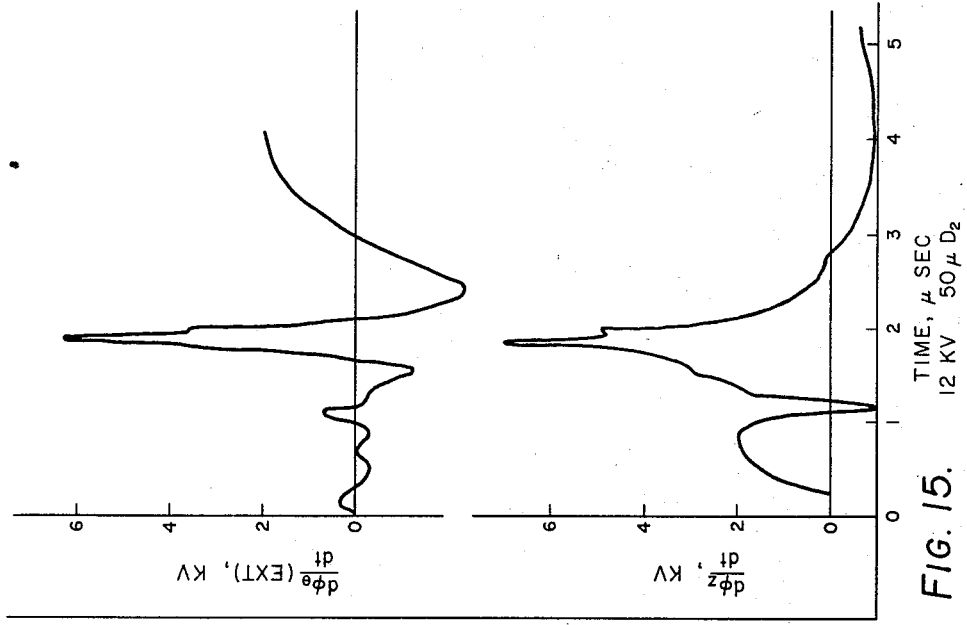
Figure 15 illustrates the effect of $\phi_z$ leakage flux on external $\phi_z$ flux on development of an $m=1$ instability in the pinch.

The bottom trace of Figure 15 shows the effect of this $\phi_z$ leakage flux on the external $\phi_\theta$ flux. Note that there never can be any $H_\theta$ field outside the return conductor unless there exists an asymmetry in the pinch current pattern. When the pinch twists up into an $m=1$ mode, the resultant leakage of $\phi_z$ flux between the braid should force a $j_z$ component to flow externally, with a resultant $d\phi_\theta/dt$ signal. The experimentally observed signal is, in fact, roughly zero until the time of the $m=1$ helical instability growth, at which time it increases by at least a factor of 10 (see Figure 15). This confirms the concept of the instability distortion of the current path.

Figure 16:
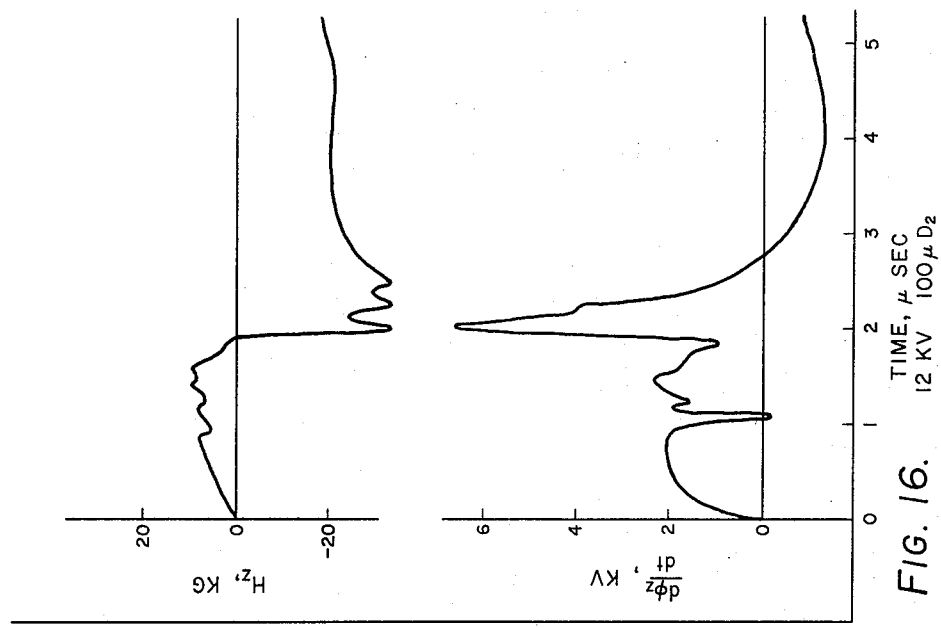
Figure 16 illustrates the behavior of the $H_z$ field inside the return conductor yet outside the pinch in the course of a screw dynamic pinch.

Figure 16 shows the $H_z$ field (integrated current loop) inside the braid return conductor, yet outside the pinch. At the time of the $m=1$ helical instability the external boundary value of $H_z$ is driven violently negative, in agreement with the expected behavior.

Figure 18:
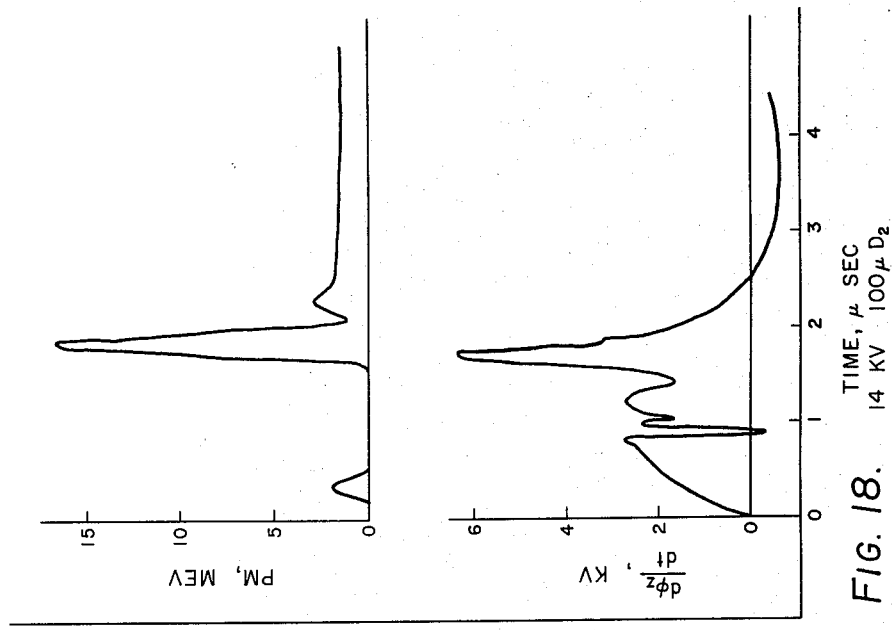
Figure 18 is a graphical illustration correlating neutron output with field behavior in a screw dynamic pinch.
Figure 17:
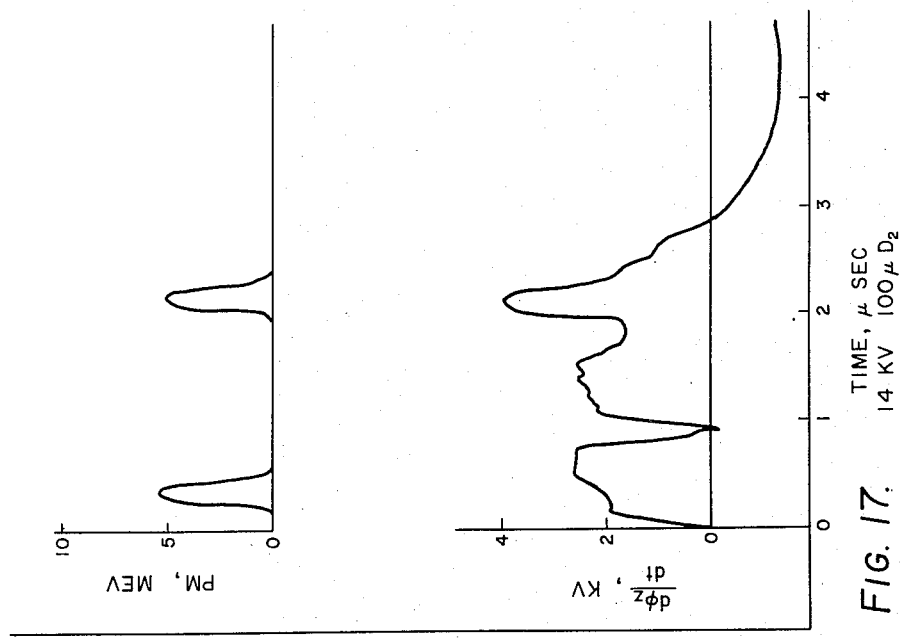
Figure 17 is a graphical illustration of the correlation of neutron outputs with current application to the screw dynamic pinch tube.

The fast time behavior of the scintillation-counter signal with one inch of lead shielding is shown in Figure 17. The first peak corresponds to the time of application of voltage and therefore the radiation is probably due to a direct acceleration process. Figure 18 shows the same signal with an additional one inch of lead shielding. The first peak is attenuated by a large factor indicating gamma or X-rays, whereas the second peak is not affected and is therefore associated with the already-verified neutrons. As additional confirmation, the first peak is independent of whether hydrogen or deuterium is used, but the second peak occurs only with deuterium.

The yield occurred only with the marked appearance of the $m=1$ instability. A large instability gave a large yield, etc. The yield was very sensitive to voltage (on the order of the fifth power), and inversely sensitive to the pressure (on the order of the third power), for pressures of 50 microns and above. Below this pressure a dynamic pinch did not form.

It is evident that the neutrons are associated with an instability growth, and so, without further evidence, it is assumed that they are not thermonuclear in origin. The high electric field accelerating mechanism of the $m=0$ instability growth does not apply in the case of $m=1$ instability. The amount of magnetic flux that the ions must cross, turn to turn, is too great in terms of possible electric fields, and so some other accelerating mechanism must be invoked for a non-thermonuclear origin, such as a "Fermi" mechanism.

Figure 19:
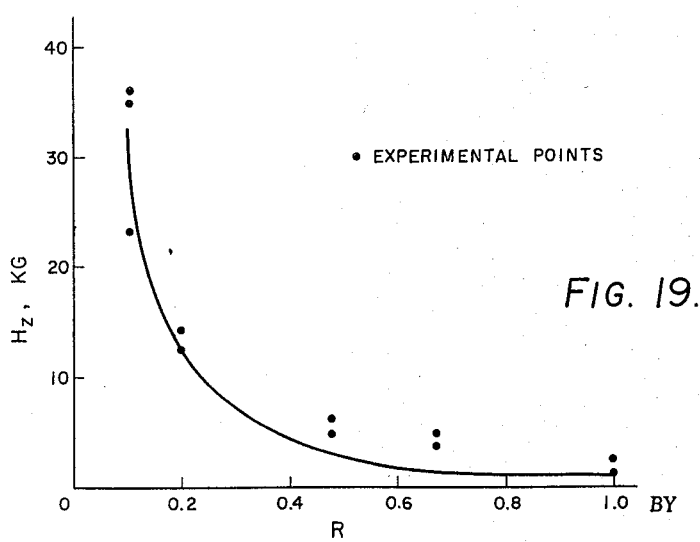
Figure 19 is a plot of the actual and the theoretical $H_z$ field distribution in screw dynamic pinch.

Figure 19 shows a plot of the $H_z$ field versus radius from the probe measurements at the time of first bounce. The agreement between theory and experiment is a remarkable confirmation of the external conductivity theory, because it verifies a case where an externally-trapped axial field is compressed by a factor of 30 to 50. The expected dip in $H_z$ at the axis is not observed because of the poor spatial resolution of the probe due to the small dimensions involved.

Figures 20, 21, 22:
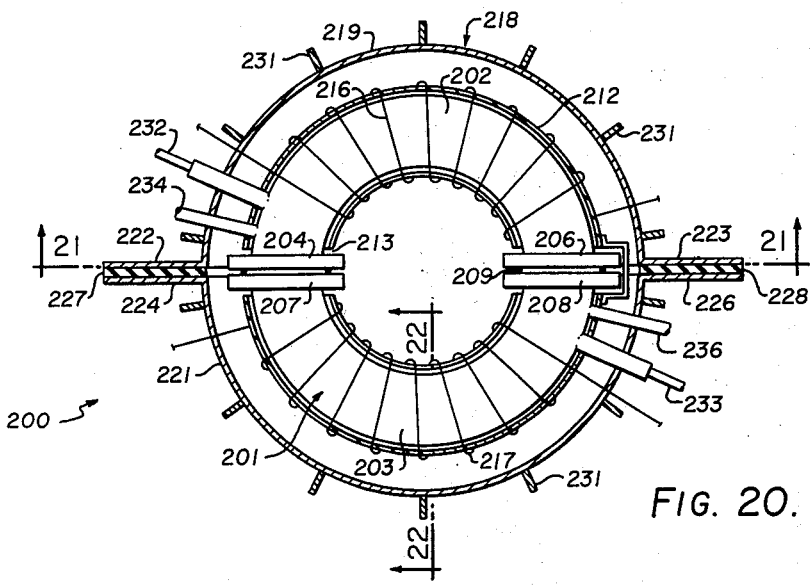
Figure 20 is a plan view with the external conducting shell broken away of a toroidal pinch tube apparatus termed "gamma pinch" which is adapted for operation in accordance with the invention.
Figure 21 is a vertical cross-sectional view along the plane 21—21 of the apparatus of Figure 20.
Figure 22 is a vertical cross-sectional view along plane 22—22 of the apparatus of Figure 20.

A toroidal pinch tube assembly 200 termed "gamma pinch" and illustrated in Figures 20–22 of the drawing is also suitable for operation in accordance with the invention. Assembly 200 includes a toroidal pinch tube 201 formed of generally similar semi-circular porcelain or ceramic halves 202 and 203 having terminal flanges, 204, 206 and 207, 208, respectively, disposed in abutting position across sealing O-rings 209 defining a toroidal vacuum chamber 211 therein and secured as by means of flange bolts (not shown). To the exterior surface of the wall of tube sections 202 and 203 a stabilizing conducting shell 212 formed of metal foil or plating, e.g., 0.015–0.020 mil copper or silver, is applied. The portions of shell 212 are joined across flanges 206 and 208 and left unjoined across flanges 204 and 207, providing a diametrical planar gap 213 thereacross and a longitudinal gap 214 is provided around the inner periphery of shell 212 to permit magnetic field penetration. The stabilizing function of shell 212 was disclosed in the aforesaid copending application as discussed above.

An insulated solenoidal winding 216 disposed concentrically about tube half-section 202 and a similar winding 217 is employed to provide stabilizing $H_z$ field and for providing the programmed field as described hereinafter. Such solenoids are constructed to provide a continuous axial symmetrical field in chamber 211 and are usually energized in a parallel circuit. A single turn primarily 218 constructed of semicircular halves 219 and 221 having terminal flanges 222–223 and 224–226 arranged in abutting relation across insulator separators 227 and 228, respectively, is constructed and arranged to encase at least the upper, lower and outer sides of tube 201, with a gap 229 extending around the inner periphery. Primary 218 is conveniently constructed with a rectangular cross section of semiannular upper and lower side sections welded at the outer periphery to a semicircular hoop section. Reenforcing flanges 231 are provided to prevent movement or collapse of the primary shell on application of intense currents due to associated magnetic fields. Laminated iron cores (not shown) may also be provided encircling primary 218 between said flanges 231. A most advantageous feature of the foregoing arrangement is in the large separation permitted between shell 218 and tube 201 by disposing stabilizing shell 212 as indicated thereby obtaining effectively a very thin separation of the initial plasma column from a stabilizing conductor and minimizing the amount of $H_z$ flux remaining exterior to the plasma. This result is quite surprising since it was originally thought that the entire primary should be so located to obtain this effect. The terminal flanges 222, 223, 224 and 226 are extended outwardly to provide terminals to which power supply transmission lines may be attached as described below.

Spark plasma sources 232 and 233 are employed in tube sections 202 and 203 to provide initial ionization as above. Such sources may be constructed as a pair of insulated spaced tungsten electrodes sealed in the tube wall and terminating just inside the tube. RF exciting solenoid may be employed likewise. Conduit 234 and conduit 236 are connected to gas supply and evacuation pump means (not shown) to supply the desired gas pressure in chamber 211.

Figure 23:
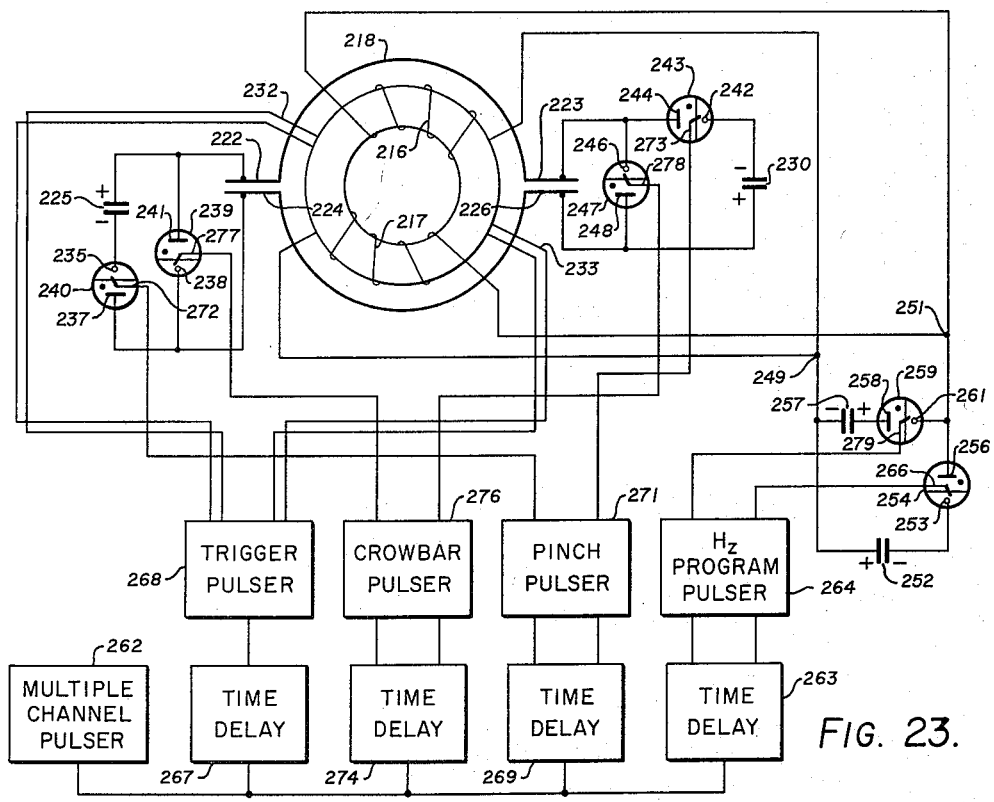
Figure 23 is a schematic wiring diagram of the electrical circuitry employed with the apparatus of Figure 20.

Circuitry employed with the toroidal pinch tube apparatus is illustrated in Figure 23 of the drawing. Similar capacitor banks 225 and 230 supplied with charging power as described above are switched in series across terminal flanges 222–224 and 223–226, respectively, of primary 218 to provide the pinch current. More particularly, the positive terminal of bank 225 is coupled to terminal flange 222 and the negative terminal is coupled to the cathode pool 235 of ignitron 240 while the anode 237 is coupled to terminal flange 224 for switching purposes. The cathode pool 238 of ignitron 239 is coupled to flange 224 and the anode 241 to flange terminal 222 for "crow-barring" as above to permit decay of the field without ringing. Similarly the positive terminal of bank 230 is coupled to flange terminal 226 while the negative terminal is coupled to cathode pool 242 of ignitron 243 and anode 244 is coupled to flange terminal 223 of primary 218. The cathode pool 246 of ignitron 247 is coupled to terminal flange 223 and the anode 248 to flange 226 for "crow-barring." Generally speaking, multiple coaxial lines or equivalent low impedance transmission lines are employed for such coupling.

Current is supplied to windings 216 and 217 connected in parallel at terminals 249 and 251 so as to provide a continuous axially symmetric $H_z$ field in chamber 211. More particularly, the positive terminal of a slow capacitor bank 252 is coupled to terminal 249 while the negative terminal is coupled to the cathode pool 253 of ignitron 254 and the anode 256 to terminal 251 of the $H_z$ winding to provide the initial $H_z$ energizing current. A fast capacitor bank 257 employed for programming the $H_z$ field is arranged with the negative terminal coupled to terminal 249 and the positive terminal to the anode 258 of ignitron 259 and the cathode pool 261 is coupled to terminal 251 of the $H_z$ winding. In order to provide proper operation, capacitor bank 257 and all of the circuit path through windings 216 and 217 are designed to provide a very rapid discharge rate while capacitor bank 252 and especially the circuits connecting banks 252 and 257 are made of a relatively high inductance, i.e., to provide a "slow" bank. Accordingly, bank 252 may be discharged first to provide the initial $H_z$ field and bank 257 discharged later to discharge principally through windings 216 and 217 to very rapidly program the $H_z$ field. The high inductance in the circuit of bank 252 thereby prevents a serious back current flow therethrough.

Subsequent to providing the atmosphere, e.g., hydrogen or deuterium in chamber 211 operation is synchronized by an initiating pulse from a multiple channel simultaneous pulse generator 262 fed through one channel of a dual channel time delay unit 263 and a channel of program pulser 264 to igniter 266 of ignitron 254 which discharges bank 252 through the $H_z$ winding. As bank 252 is discharging a pulse fed from unit 262, through appropriately set time delay unit 267 is applied to trigger pulser 268 causing an ionized plasma to be produced by triggers 232 and 233, coupled thereto, constrained within the axially symmetric magnetic field in chamber 211. Immediately, thereafter, the initiating pulse from unit 262, fed through dual channel delay unit 269 and dual channel pulser 271 is applied simultaneously to igniters 272 and 273 of ignitrons 240 and 243, respectively, discharging banks 225 and 230 through primary 218, to provide the pinch discharge. As the pinch current nears the peak, the initiating pulse from unit 262 applied through dual channel time delay 274 and crowbar pulser 276 is applied simultaneously to igniters 277 and 278 of ignitrons 239 and 247 to crowbar the pinch circuit and allow the field to decay as $1/e$. As the pinch discharge produced thereby moves inwardly from the wall of chamber 211, trapping initial $H_z$ therein, the initiating pulse from unit 262 fed through the second channel of delay unit 263 and the programmed channel of pulser 264 is applied to the igniter 279 discharging fast capacitor bank 257 through the $H_z$ winding diminishing or reversing the $H_z$ flux external of the plasma as determined so as to improve the boundary separation between $H_\theta$ and $H_z$ or to trap at least one additional $H_z$ peak external to the main plasma column.

An apparatus wherein the toroidal tube was of ceramic with a $\frac{3}{16}$" thick wall, 4 inches in tubular diameter and 24 inches mean major diameter was operated as described. The capacitor banks powering the pinch tube were of identical $10^5$ joule, 20 kilovolt nominal rating, i.e., 60 capacitors each of 7.5 mfd. capacity usually charged to ¼ to ½ voltage rating giving about 20 to 30 kilovolts across the primary. Multiple paralleled ignitrons were used to carry the heavy currents and the pinch current generally was in the 200,000–300,000 ampere range with a scanty laminated core in place. The slow condenser bank provided the initial field in millisecond or somewhat less time period while the fast condenser bank was capable of producing effective "bucking out" or reversing fields in microseconds. $H_z$ winding had 16 turns, slow bank of 60 capacitors of 7.5 mfd. charged to about 5000 volts and the fast bank 120–7.5 mfd. capacitors charged to 10.5 kilovolts nominal rating but voltages adjusted to give the desired method of operation. The primary conductor was fabricated of $\frac{3}{8}$" aluminum heliarc welded.

In a typical sequence of operations the slow bank was fired to produce the initial stabilizing $H_z$ field in the vacuum chamber. After times of from about 50–150 microseconds the triggers were fired providing initial ionization and trapping a relatively cool plasma retained in the $H_z$ field in the chamber. At about 200 microseconds the pinch current was applied requiring about 14 $\mu$seconds to reach peak and was "crow-barred" to decay to $1/e$ in about 15 µseconds. At times of about 2–3 µseconds following application of the pinch current when the pinch discharge was formed or was moving inwardly the fast reversing bank was discharged to reduce, reverse or otherwise program $H_z$ field external to the pinch. Initial deuterium pressures of 5 to 20 microns were employed resulting in the production of neutrons under various operating conditions.

The neutron production dependence on $H_z$ field program is quite distinctive with the various modes of operation. If an initial $H_z$ field of 1600 gauss was employed and was compressed simply by application of the pinch field the indistinct distribution illustrated in Figure 24 of the drawing was obtained and the neutron production was low or absent. If the fast reversing bank was employed to reduce external $H_z$ to zero or slightly below, the pinch distribution becomes sharp as illustrated in Figure 25. If a considerable excess of reverse or negative $H_z$ was programmed into the plasma external to the pinch the neutron yield became larger as indicated in Figure 26 of the drawing. Preliminary considerations indicate that temperatures of the order of 50 e.v. have been obtained with higher temperatures obtainable in larger apparatus and with additional care being given to excluding extraneous wall materials and other impurities which cool the plasma by increasing radiation losses. Neutron yields equivalent to about 500 e.v. have been observed.

While there have been described in the foregoing what may be considered to be preferred embodiments of the invention modification may be made therein without departing from the teachings of the invention and it is intended to cover all such as fall within the scope of the appended claims.

What we claim is:

1. Apparatus for the production and manipulation of a plasma comprising electrical gaseous pinch discharge tube means provided with evacuation and gas supply means for introducing a gaseous atmosphere therein, means for supplying an initial axially symmetric stabilizing $H_z$ field in said discharge tube, electrical power supply means for initiating and establishing the gaseous pinch discharge in said tube thereby providing a plasma in which said initial stabilizing $H_z$ field is trapped and the plasma is compressed leaving a residual portion of the $H_z$ field in the plasma external to the main plasma column, and axially symmetric magnetic field generating means coupled to said tube and programmed as a function of said compression for supplying magnetic field to said tube to modify the boundary value of said external $H_z$ field.

2. Apparatus for the production of a stabilized pinch discharge comprising a pinch discharge tube provided with evacuation and gas supply means for introducing a gaseous atmosphere therein, a solenoid disposed to provide an axially symmetric $H_z$ field within said tube, electrical power supply means adapted to supply an energizing current to said solenoid to produce an initial stabilizing $H_z$ field therein, electrical power supply means coupled to said tube to initiate and produce a pinch discharge in said tube whereby the major proportion of said $H_z$ field is trapped in the plasma and is compressed therewith leaving a residual amount of $H_z$ field external thereto, and electrical power supply means having the output programmed as a function of said compression and with the programmed current output applied to said solenoid to modify the wall boundary value of the external $H_z$ field and thereby modify the boundary value of the $H_z$ and $H_\theta$ fields of the pinch discharge.

3. Apparatus as defined in claim 2 wherein said discharge tube is provided with means for producing an initial ionized plasma in said initial stabilizing $H_z$ field.

4. Apparatus for the production of a stabilized pinch discharge comprising a discharge tube including a tubular housing defining a chamber provided with longitudinally spaced electrodes and fitted with evacuation and gas supply means for introducing a gaseous atmosphere into said chamber, a solenoidal winding disposed to provide an axially symmetric $H_z$ field in said chamber, electrical power supply means arranged to apply current to said solenoidal winding to establish an initial $H_z$ field therein, electrical power supply means connected to said electrodes to produce a pinch discharge which traps and compresses the $H_z$ field in the plasma in the chamber with a residual portion remaining external thereto, and electrical power supply means having the current output programmed as a function of said compression said programmed current output being applied to said solenoid to modify the wall boundary value of the external $H_z$ field and thereby modify the boundary value of the $H_z$ and $H_\theta$ fields of the pinch discharge.

5. Apparatus for the production of a stabilized pinch discharge comprising a discharge tube including a tubular housing defining a chamber provided with longitudinally spaced electrodes and with the split cylindrical return conductor of one of said electrodes extending along said housing said tube being fitted with evacuation and gas supply means for introducing a gaseous atmosphere into said chamber, a solenoidal winding disposed exteriorly of said return conductor to provide an axially symmetric $H_z$ field in said chamber, a programmed $H_z$ field solenoid disposed between said return conductor and the tube wall, electrical power supply means arranged to apply current to said solenoidal winding to establish an initial $H_z$ field therein, electrical power supply means connected to said electrodes to produce a pinch discharge which traps and compresses the $H_z$ field in the plasma in the chamber with a residual portion remaining external thereto, and electrical power supply means having the current output programmed as a function of said compression said programmed current output being applied to said programmed $H_z$ field solenoid to modify the wall boundary value of the external $H_z$ field and thereby modify the boundary value of the $H_z$ and $H_\theta$ fields of the pinch discharge.

6. Apparatus for the production of a stabilized pinch discharge comprising a discharge tube including a tubular insulator housing defining a chamber having electrodes disposed terminally therein and with the split cylindrical return conductor of the second of said electrodes disposed along said housing said tube being fitted with evacuation and gas supply means for introducing a gaseous atmosphere in said chamber, an $H_z$ solenoidal winding disposed concentrically about said return conductor, a programmed $H_z$ field solenoid disposed between said return conductor and the tube wall, electrical power supply means arranged to apply current to said solenoidal winding to establish an initial axially symmetric $H_z$ field in said chamber, electrical power supply means connected to the first electrode and return conductor of the second electrode of said tube to produce a pinch discharge which traps and compresses the $H_z$ field in the plasma in the chamber with a residual portion remaining external thereto, a capacitor coupled across said programmed $H_z$ field coil which produces an oscillation therein on establishment of the pinch discharge effective in modifying the wall boundary value of the $H_z$ field so as to trap at least one additional $H_z$ field peak in the external plasma region.

7. Apparatus for the production of a stabilized pinch discharge comprising a discharge tube including a tubular insulator housing defining a chamber having electrodes disposed terminally therein and with the split cylindrical return conductor of the second of said electrodes disposed along said housing said tube being fitted with evacuation and gas supply means for introducing a gaseous atmosphere into said chamber, an $H_z$ solenoidal winding disposed concentrically about said return conductor, a programmed $H_z$ field solenoid disposed between said return conductor and the tube wall, electrical power supply means arranged to apply current to said solenoidal winding to establish an initial axially symmetric $H_z$ field in said chamber, electrical power supply means connected to the first electrode and return conductor of the second electrode of said tube to produce a pinch discharge which traps and compresses the $H_z$ field in the plasma in the chamber with a residual portion remaining external thereto said power supply also being connected across said programmed $H_z$ field solenoid so that a portion of the current flows therethrough providing an $H_z$ field at the wall of the tube which decreases the intensity of the initial $H_z$ field external to the discharge thereby sharpening the boundary between the $H_z$ and $H_\theta$ fields in the plasma.

8. Apparatus for the production of a dynamic pinch discharge preferentially stabilized against $m=0$ instabilities comprising a discharge tube including a tubular insulator housing defining a chamber provided with evacuation and gas supply means and having first and second electrodes disposed terminally in said chamber, said second electrode being provided with a cylindrical conductor slotted longitudinally along helical paths to provide multiple helical segments returning along the outside of said housing, and power supply means for supplying current to said first electrode and the return conductor to the second electrode to initiate and produce a pinch discharge in said tube in which the boundary value of the $H_\theta$ and $H_z$ field assumes a fixed ratio dependent upon the helical twist angle of the return conductor, whereby $H_z$ field external to the discharge is trapped and compressed to selectively suppress the $m=0$ instability mode.

9. Apparatus for the production of a stabilized pinch discharge comprising a toroidal discharge tube including a toroidal tubular insulator housing defining a chamber provided with evacuation and gas supply means and with a stabilizing sheath disposed on the outer surface, means for producing initial ionization in said chamber, solenoidal means disposed to provide an axially symmetric $H_z$ field longitudinally in said chamber, a single turn primary coupled to said chamber to provide a pinch discharge in said chamber, a first power supply energizing means connected to said solenoid to provide an initial stabilizing $H_z$ field therein, power supply energizing means connected to said primary to produce said pinch discharge which traps and compresses initial $H_z$ field in the plasma with residual field remaining in the external plasma, and a second power supply means programmed as a function of said compression and connected to said solenoid to modify the wall boundary value of the external $H_z$ field.

10. Apparatus as defined in claim 9 wherein at least one laminated iron core segment is disposed to encircle the primary and discharge tube.

11. Apparatus as defined in claim 9 wherein said means for producing initial ionization comprises at least one means for producing an electrical spark discharge therein.

12. Apparatus as defined in claim 9 wherein said means for producing initial ionization comprises RF ionizing means coupled to said chamber.

13. Apparatus as defined in claim 9 wherein said programmed power supply means is arranged to reverse the direction of current flow produced by the said first power supply in the solenoid so as to reduce the wall boundary value of the external $H_z$ field.

14. A pinch discharge tube apparatus comprising a tubular insulator housing defining a chamber, means coupled with said chamber for establishing a pinch discharge in said chamber, solenoid means disposed to provide an initial axially symmetric stabilizing $H_z$ field in said chamber, and a second solenoid means disposed to provide an axially symmetric programmed $H_z$ field in said chamber.

15. A linear pinch discharge tube apparatus comprising a tubular cylindrical insulator housing defining a chamber, pinch discharge electrodes spaced longitudinally within said chamber, means for introducing a gas into said chamber, spark discharge means disposed to ionize gas in said chamber, means including a solenoid disposed concentrically about said chamber to provide an axially symmetric stabilizing $H_z$ field therein, and means including a second solenoid disposed concentrically about said chamber to provide a programmed $H_z$ field in said chamber.

16. A linear pinch discharge tube apparatus comprising a tubular cylindrical insulator housing, first and second reentrant pinch discharge electrodes closing the ends of said housing, a longitudinally split tubular conductor connected to one said electrodes and returning along the exterior of said housing, conduit means entering one of said electrodes to introduce a gas into said housing, spark discharge means carried by one of said electrodes for ionizing said gas, a solenoidal winding disposed about said housing for providing an initial stabilizing $H_z$ field therein, and a second solenoidal winding disposed about said housing for providing a programmed $H_z$ field therein.

17. A screw dynamic pinch tube apparatus comprising a tubular cylindrical insulator housing, first and second reentrant pinch discharge electrodes closing the ends of said housing, a tubular conductor longitudinally split along parallel helical paths connecting to one of said electrodes and returning along said housing, conduit means connected to one of said electrodes for introducing a gas into said housing, and spark discharge means mounted on one of said electrodes for ionizing said gas.

References Cited in the file of this patent

UNITED STATES PATENTS

| | | |
|---|---|---|
| 2,512,301 | Breese | June 20, 1950 |
| 2,652,532 | Zemany | Sept. 15, 1953 |
| 2,669,609 | Linder | Feb. 16, 1954 |
| 2,690,515 | Mack | Sept. 28, 1954 |
| 2,690,521 | Turner | Sept. 28, 1954 |
| 2,826,708 | Foster | Mar. 11, 1958 |